US006378678B1

United States Patent
Armitage et al.

(10) Patent No.: US 6,378,678 B1
(45) Date of Patent: Apr. 30, 2002

(54) TWIN MASS FLYWHEEL ASSEMBLIES

(75) Inventors: Bradley Armitage, Coventry; Adam Johnson Lambert, Sherburn Village; Anthony John Curtis, Leamington Spa, all of (GB)

(73) Assignee: Automotive Products UK, LTD, Leamington Spa (GB)

( * ) Notice: Subject to any disclaimer, the term of this patent is extended or adjusted under 35 U.S.C. 154(b) by 0 days.

(21) Appl. No.: 09/486,481

(22) PCT Filed: Jun. 28, 1998

(86) PCT No.: PCT/GB98/01994

§ 371 Date: May 15, 2000

§ 102(e) Date: May 15, 2000

(87) PCT Pub. No.: WO00/00755

PCT Pub. Date: Jan. 6, 2000

(30) Foreign Application Priority Data

Jun. 30, 1998 (GB) .............................................. 9814004

(51) Int. Cl.[7] .............................. F16D 3/14; F16D 7/02
(52) U.S. Cl. ..................... 192/55.1; 192/70.18; 464/41; 464/46
(58) Field of Search ............................... 192/55.1, 56.6, 192/70.17, 70.18, 212, 56.1; 464/41, 46

(56) References Cited

U.S. PATENT DOCUMENTS

| | | | |
|---|---|---|---|
| 1,750,828 A | * 3/1930 | Wemp ..................... 192/70.18 |
| 1,896,025 A | * 1/1933 | Griswold .................. 192/70.18 |
| 3,457,733 A | * 7/1969 | Bangerter et al. ........ 464/46 X |
| 3,602,346 A | * 8/1971 | Daughtery ................ 464/46 X |
| 3,700,271 A | * 10/1972 | Blaurock et al. |
| 4,274,524 A | * 6/1981 | Nakane ..................... 192/70.17 |
| 4,840,262 A | * 6/1989 | Herrmann ............... 192/212 X |
| 4,889,218 A | * 12/1989 | Chasseguet et al. ...... 464/46 X |
| 4,928,486 A | * 5/1990 | Despres ................. 192/55.1 X |
| 4,932,921 A | * 6/1990 | Kobayashi et al. .... 192/55.1 X |
| 5,842,922 A | * 12/1998 | Reik et al. ............. 192/55.1 X |

FOREIGN PATENT DOCUMENTS

| | | | |
|---|---|---|---|
| DE | 916370 | * | 8/1954 |
| EP | 0814012 A1 | * | 12/1997 |
| GB | 2171494 A | * | 8/1986 |
| GB | 2184515 A | * | 6/1987 |
| WO | WO-96/38681 | * | 12/1996 |

* cited by examiner

Primary Examiner—Rodney H. Bonck
(74) Attorney, Agent, or Firm—Paul E Milliken; Ray L Weber

(57) ABSTRACT

A twin mass flywheel assembly in the form of a twin mass flywheel (12), a clutch cover (11) attached to the flywheel, a clutch driven plate (19), a clutch pressure plate (14), and spring means (18) supported from the cover to clamp the driven plate between the flywheel and pressure plate to transmit torque through the assembly. The driven plate (19) includes a central hub portion (24) and an outer friction portion (25) supported from the hub portion via a slipping clutch which may be in the form of a tolerance ring (32) which allows relative rotation between these portions at torque levels above a predetermined torque thus protecting the assembly and associated driveline from damage due to high level but short duration torsional loading.

13 Claims, 5 Drawing Sheets

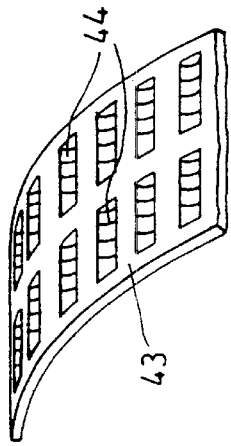
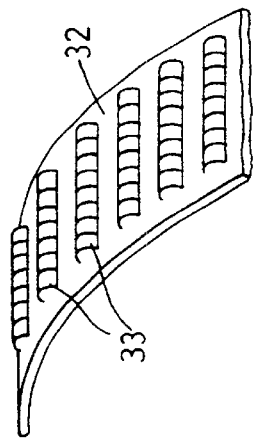
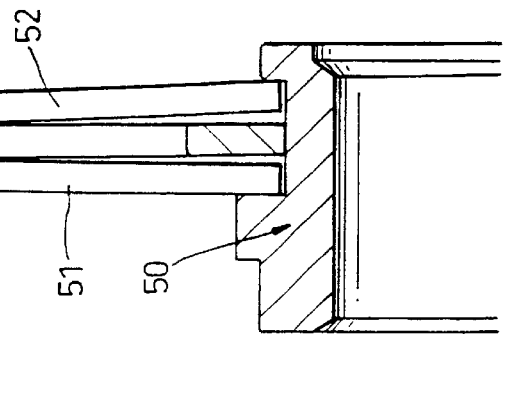
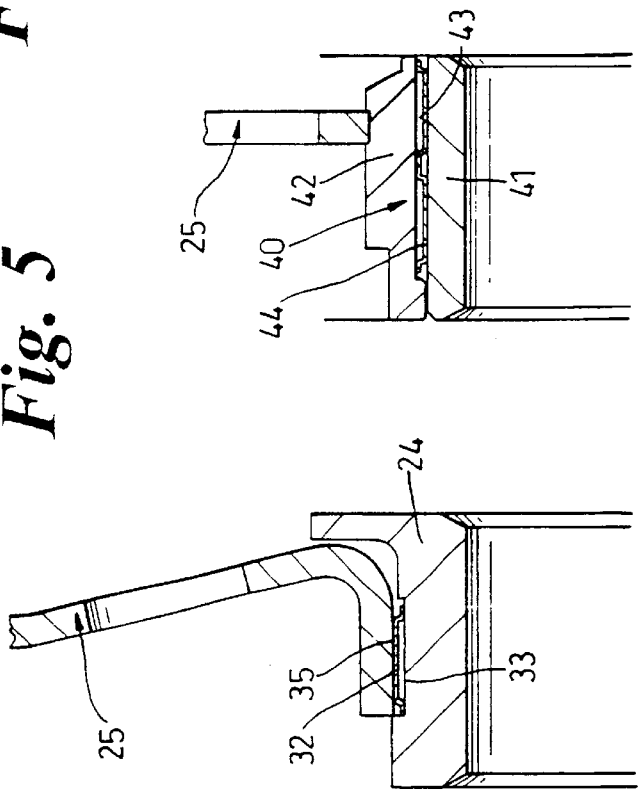

TWIN MASS FLYWHEEL ASSEMBLIES

This invention relates to twin mass flywheels, hereinafter referred to as of the kind specified, comprising an input mass for connection with an associated engine and an output mass for connection with an associated vehicle driveline, said masses being relatively rotatable against the action of a torsional damping means to damp torsional vibrations in the associated vehicle driveline and to twin mass flywheel assemblies including such flywheels.

One of the problems associated with such flywheels is the protection of the flywheel and associated driveline against high level but short duration loading which can arise during stopping and starting of the associated vehicle and also during certain abusive driving conditions such as speed gear shifting and bump starting of the vehicle.

These problems are particularly apparent with twin mass flywheels of the kind specified in which the relative rotation of the flywheel masses is opposed by compressing coil springs and the angular relative rotation of the masses is relatively high. This can give rise to a bounce condition which results in multiple reversals of drive torque with the level of torque being successively increased on each torque reversal.

It is an object of the present invention to provide a twin mass flywheel assembly which offers a relatively low cost but effective solution to the protection of the twin mass flywheel and associated drive line against such high level but short duration torque loading.

Thus according to the present invention there is provided a twin mass flywheel assembly comprising a twin mass flywheel of the kind specified, a clutch cover attached to the flywheel, a clutch driven plate, a clutch pressure plate, and spring means supported from the cover to clamp said driven plate between the flywheel and pressure plate to transmit torque through the assembly, said driven plate including a central hub portion and an outer friction portion supported from the hub portion via a slipping clutch which allows relative rotation between said portions at torque levels above a predetermined torque.

Such a twin mass flywheel assembly protects both the twin mass flywheel and associated drive-line from the high level torque loading which may arise during, for example, stopping and starting of the associated vehicle by allowing slippage of the slipping clutch to absorb the high level torque loading.

The friction portion of the slipping clutch may be mounted on the hub portion via an annular tolerance ring which slips relative to the hub portion and/or friction portion at torque levels above said predetermined level.

The hub portion may be divided radially into inner and outer hub portions with said friction portion supported from the outer hub portion and an annular tolerance ring located between the inner and outer hub portions, the tolerance ring allowing relative rotation between the hub portions at torque levels above said predetermined level.

The friction portion may be held rotationally fast with the hub portion up to said predetermined level of torque by a friction clutch which includes an axial acting spring means.

The friction clutch may include a belleville or other dished spring member which acts against an abutment on the hub portion at one location and frictionally grips the friction portion at another location.

The friction clutch may include two bellevilles or dished spring members which act towards each other and grip the friction portion therebetween.

The present invention also provides a clutch cover assembly comprising a clutch cover for attachment to an associated flywheel, a pressure plate mounted on the cover via torque straps designed to be loaded in torsion when the clutch is transmitting torque in the normal forward drive direction, spring means acting to bias the pressure plate towards the flywheel, and a driven plate for clamping against the flywheel by the spring means via the pressure plate, the driven plate comprising a central hub portion and an outer friction portion supported from the hub portion via a slipping clutch which allows relative rotation between said portions at torque levels above a predetermined torque to prevent excessive loading of the torque straps particularly in buckling.

Such a clutch cover assembly has particular benefit when used with a twin mass flywheel of the kind specified as discussed above when it protects the torque straps against the high torque levels which can be generated (up to 10 times the strap design load) which can cause strap failure particularly when the straps are loaded in buckling. The clutch assembly is also of benefit when used with a normal flywheel.

The present invention will now be described, by way of example, with reference to the accompanying drawings in which:

FIG. 4 shows in section and on a larger scale the hub details of the driven plate shown in FIGS. 1 and 2;

FIG. 5 shows details of a tolerance ring used in the driven plate of FIG. 4;

FIG. 6 shows a section through alternative driven plate hub arrangement;

FIG. 7 shows details of a tolerance ring used in the driven plate of FIG. 6;

FIG. 8 shows a section through a still further alternative driven plate hub arrangement.

Figure 1:
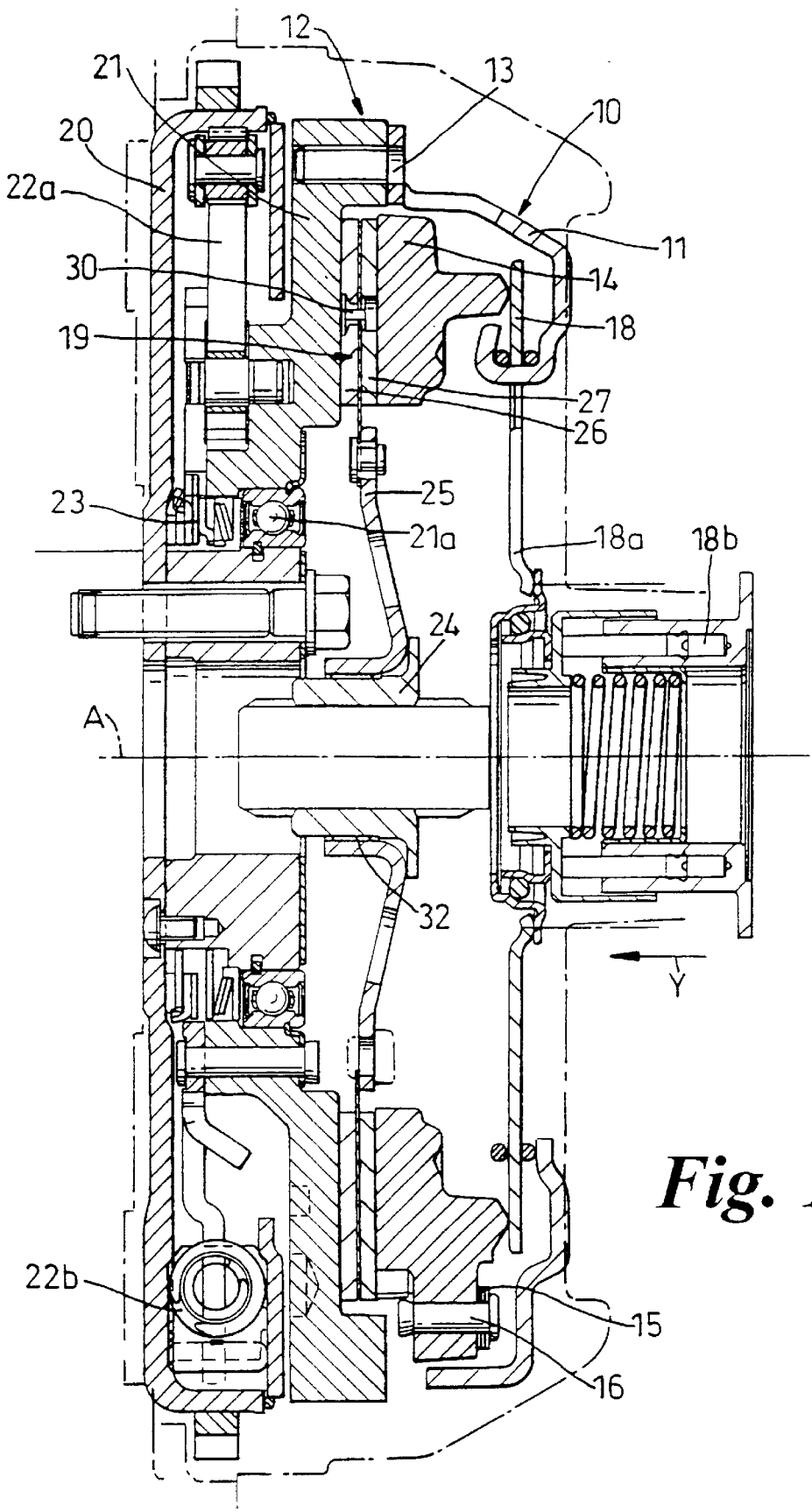
FIG. 1 is a section through a twin mass flywheel assembly in accordance with the present invention.
Figure 3:
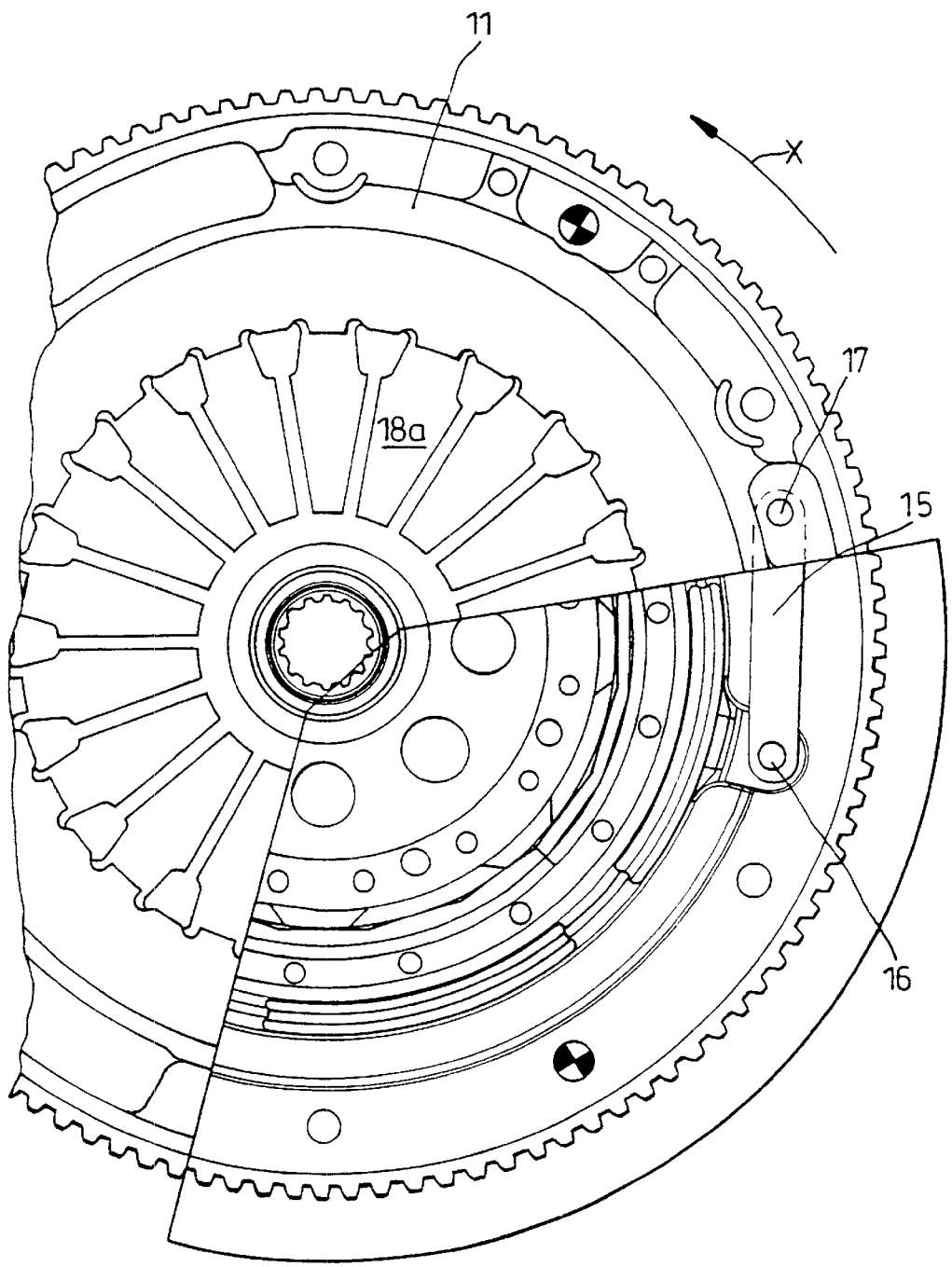
FIG. 3 shows the torque strap details of part of the assembly of FIG. 1.

Referring to FIG. 1 this shows a clutch cover assembly 10 in which a clutch cover 11 is secured to a twin mass flywheel 12 by studs 13. The cover 11 carries a pressure plate 14 which is supported from the cover by torque straps 15 and which clamps a driven plate 19 against flywheel 12. One end of each torque strap is rivetted at 16 to the pressure plate and at 17 to the cover. The torque straps function in the normal manner allowing the pressure plate to move axially relative to the cover and providing some retractive force for the pressure plate when the clutch is released and at the same time resisting circumferential movement of the pressure plate relative to the cover. As is conventional, the torque straps are arranged so that when the clutch is transmitting torque in the normal forward drive direction shown by the arrow X in FIG. 3 the straps are loaded in tension. Transmission of torque in the opposite reverse drive direction loads the straps in buckling.

The pressure plate is biased towards the twin mass flywheel 12 by a diaphragm spring 18 in the conventional manner. The radially inner portion of the diaphragm spring is fingered at 18a as normal and the clutch is released by pushing the fingers 18a in the direction of Y of FIG. 1 to release the clamp load imposed on the driven plate 19 using an hydraulic concentric slave cylinder 18b.

The twin mass flywheel 12 basically comprises an input mass 20 and an output mass 21 which rotate together about the axis A of the clutch assembly and which are capable of limited relative rotation via bearing 21a to damp out torsional vibrations in the driveline against the action of a damping means such as a series of circumferentially spaced bob weights 22a and end travel springs 22b. The relative rotation of the flywheel masses is also controlled by a friction damping device 23 which acts between the two flywheel masses. An example of this type of bob weight twin mass flywheel is shown in the Applicants earlier patent application number WO96/38681.

The twin mass flywheel could use any other known means of damping the relative rotation of the input and output masses. For example this damping could be achieved using circumferentially spaced compression springs in place of bob weights 22a.

Figure 2:
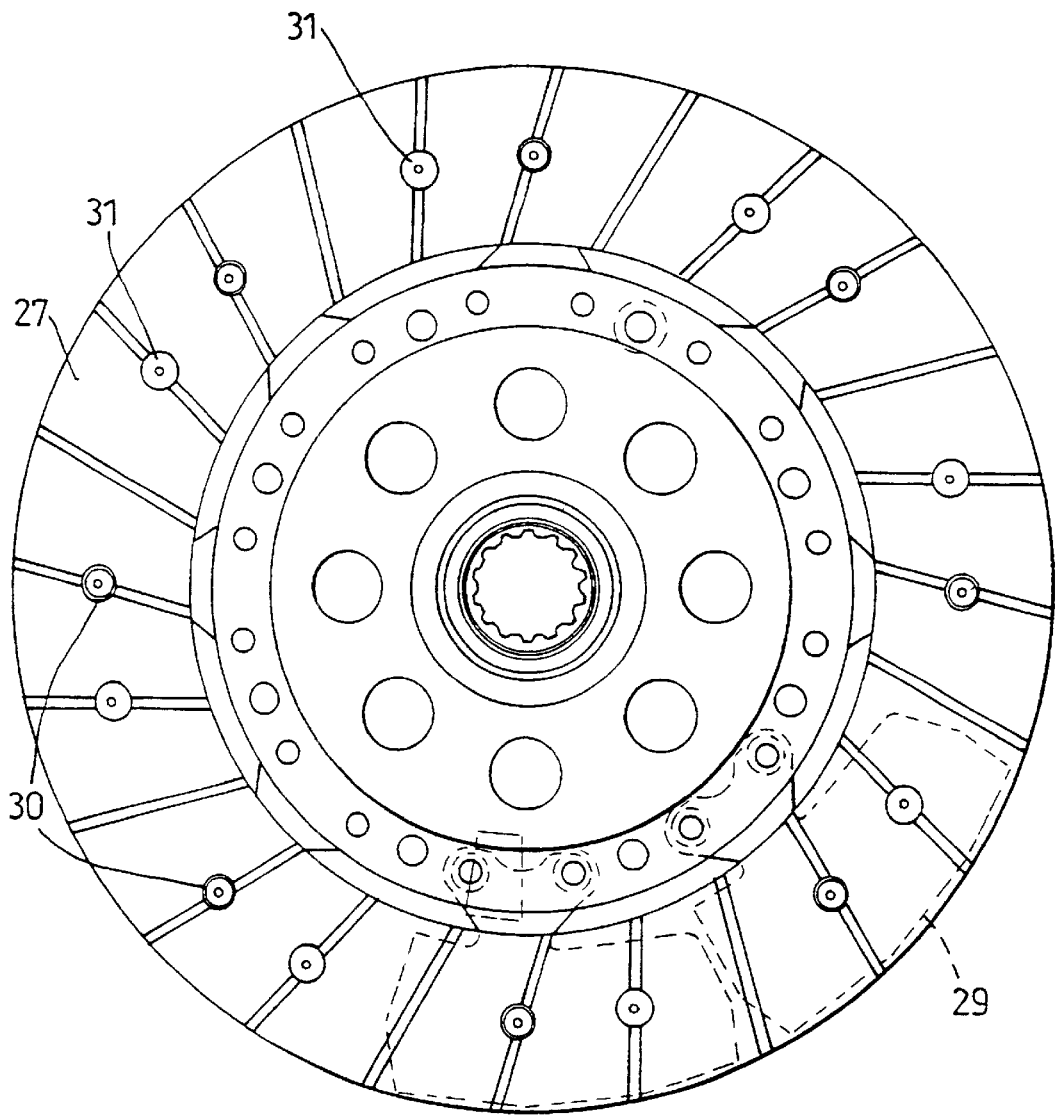
FIG. 2 is a side view of a clutch driven plate used in the assembly of FIG. 1.

In accordance with the present invention the driven plate 19 has a central hub portion 24 and an outer friction portion 25. The outer friction portion comprises a central pressed metal disc 28 on which the clutch facings 26 and 27 are mounted via a series of spring steel mounting segments 29. As can be seen from FIGS. 1 and 2 the clutch facings 26 and 27 are rivetted to the mounted segments 29 by rivets 30 and 31 respectively. The disc portion 25 of the driven plate is mounted on the hub portion 24 via a corrugated tolerance ring 32 part of which is shown in more detail in FIG. 5 and comprises a series of circumferentially spaced corrugations 34. The tolerance ring is mounted in a groove 33 in hub 24 and grips the radially inner surface 35 of the friction portion 25 of the driven plate with sufficient force to be able to transmit approximately twice the rated maximum torque output of the associated engine.

Thus the friction grip provided between the hub portion 24 and friction portion 25 of the driven plate functions as a slipping or torque limiting clutch which prevents the transmission through the clutch of torque levels in excess of two times the maximum rated engine torque. Thus when the torque straps are subjected to loading in buckling (i.e. when the engine is switched off or when a bump start is attempted) the maximum torque to which the torque straps can be subjected is held at a level which will not result in permanent damage to the torque straps. As indicated earlier the risk of damage to the torque straps due to high levels of loading buckling can be greatly increased when the driven plate is used with a twin mass flywheel which uses compression springs to resist the relative rotation of the input and output flywheel masses since such twin mass flywheels allow a relatively large angular relative rotation between the flywheel masses and a bounce condition can ensue in which multiple reversals of the drive torque occur with the torque level being successively increased on each torque reversal. In extreme conditions this can lead to torque levels of up to 10 times the maximum engine torque with consequent severe risk of damage to the torque straps. These problems are all alleviated by the present invention which will not transmit a torque level higher than that set by the level of grip between the hub portion 24 and friction portion 25 of the driven plate.

FIG. 6 shows an alternative hub arrangement for the driven plate in which the hub portion 40 is divided into an inner hub portion 41 and an outer hub portion 42 on which the friction portion 25 is non-rotatably mounted by, for example, a swaging operation. Between the two hub portions a tolerance ring 43 is mounted of the general form part of which is shown in FIG. 7 which includes pairs of circumferentially spaced corrugations 44. As with the tolerance ring 32 of FIG. 4, the level of grip between the tolerance ring 43 and the inner and outer hub portions 41 and 42 is adjusted to give the required maximum transmittable engine torque thus again protecting the clutch against torque strap damage etc.

FIG. 8 shows yet a further form of hub arrangement for a driven plate in accordance with the present invention in which the hub portion 50 grips the friction portion 25 between an opposed pair of belleville washers 51 and 52. The level of friction grip between the washers 51 and 52 and the friction portion 25 is again set to give the desired maximum transmittable engine torque.

Figure 9:
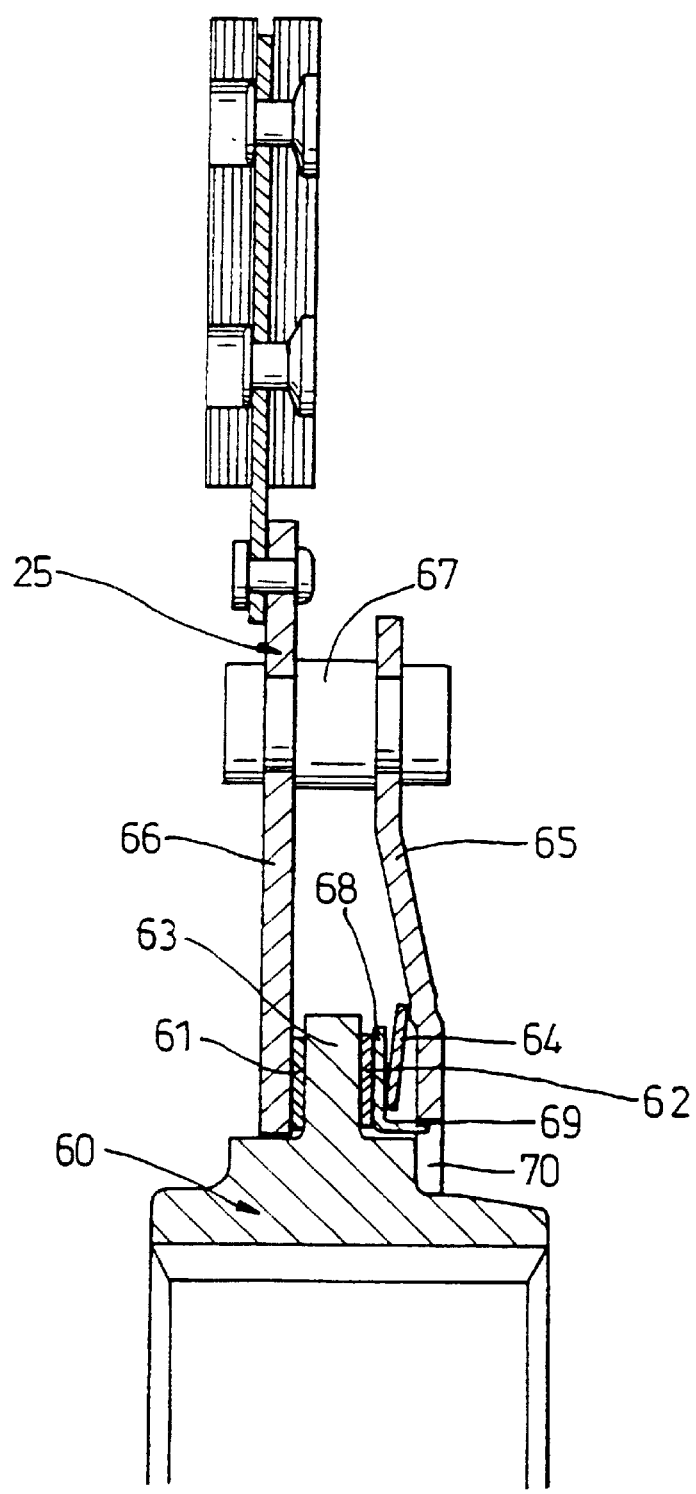
FIG. 9 shows a section through yet another alternative driven plate hub arrangement.

Any other suitable form of friction clutch can be employed between the hub portion and friction portion of the driven plate without departing from the scope of the present invention. For example, FIG. 9 shows a hub arrangement in which the hub portion 60 grips the friction portion 25 via friction rings 61 and 62 which a biased into frictional contact with hub flange 63 by a belleville spring 64 which reacts against a side plate 65 which is rivetted to a spaced side plate 66 at 67. Belleville spring 64 acts via pressure ring 68 which has tabs 69 engaging slots 70 in plate 66 to prevent rotation of ring relative to plate 65. Rings 61 and 62 may be separate from side plate 66 and pressure ring 68 or may be bonded thereto or to flange 63.

The present invention thus provides a twin mass flywheel assembly, a clutch cover assembly and a clutch driven plate which offer a solution to the problem of short duration high torque loading.

What is claimed is:

1. A twin mass flywheel assembly comprising an input mass for connection with an associated engine and an output mass for connection with an associated vehicle driveline, said masses being relatively rotatable against the action of a torsional damping means to damp torsional vibrations, clutch cover attached to the output mass, a clutch driven plate, a clutch pressure plate, and spring means supported from the cover to clamp said driven plate between the output mass and pressure plate to transmit torque through the assembly, said driven plate including a central hub portion and an outer friction portion supported from the hub portion via a slipping clutch which allows relative rotation between said portions at torque levels above a predetermined torque.

2. An assembly according to claim 1 in which the friction portion is mounted on the hub portion via an annular tolerance ring which forms the slipping clutch and which slips relative to the hub portion and/or friction portion at torque levels above said predetermined level.

3. An assembly according to claim 1 in which the hub portion is divided radially into inner and outer hub portions with said friction portion supported from the outer hub portion and an annular tolerance ring forming the friction clutch and located between the inner and outer hub portions, the tolerance ring allowing relative rotation between the hub portions at torque levels above said predetermined level.

4. An assembly according to claim 1 in which the slipping clutch is of the friction type and includes an axial acting spring means to provide a friction grip between said drive plate portions.

5. An assembly according to claim 4 in which the slipping clutch includes one or more friction rings which are biased into frictional contact with the hub portion and friction portion or components rotatable therewith by an axial acting spring means in the for of a Belleville spring to transmit torque therebetween.

6. An assembly according to claim 4 in which the slipping clutch includes an axially acting spring means in the form of a Belleville or other dished spring member which acts against an abutment on the hub portion at one location and frictionally grips the friction portion at another location.

7. An assembly according to claim 6 in which the slipping clutch includes an axially acting spring means in the form of two Belleville or dished spring members which act towards each other and grip the friction portion therebetween.

8. An assembly according to any one of claim 1 in which the pressure plate is mounted on the cover via torque straps designed to be loaded in tension when the clutch is transmitting torque in the normal forward drive direction and the slipping clutch allows relative rotation between said portions at torque levels above said predetermined torque to prevent excessive loading of the torque straps particularly in buckling.

9. A clutch cover assembly comprising: a clutch cover for attachment to an output mass of an associated twin mass flywheel, a pressure plate mounted on the cover via torque straps designed to be loaded in tension when the clutch is transmitting torque in the normal forward drive direction, spring means acting to bias the pressure plate towards the output mass of the twin mass flywheel, and a driven plate for clamping against the output mass by the spring means via the pressure plate, the driven plate comprising a central hub portion and an outer friction portion supported from the hub portion via a slipping clutch which allows relative rotation between said portions at torque levels above a predetermined torque to prevent excessive loading of the torque straps particularly in buckling.

10. A clutch driven plate for use in the assembly of claim 9 in which the friction portion of the driven plate is mounted on the hub portion via an annular tolerance ring which forms the slipping clutch and which slips relative to the hub and/or friction portion at torque levels above said predetermined level.

11. A clutch driven plate for use in the assembly of claim 9 in which the slipping clutch is of the friction type and includes an axial acting spring means to provide a friction grip between said drive portions.

12. A clutch driven plate for use in the assembly of claim 9 in which the slipping clutch includes one or more friction rings which are biased into frictional contact with the hub portion and friction portion or components rotatable therewith by an axial acting spring means in the form of a Belleville spring to transmit torque therebetween.

13. A clutch driven plate for use in the assembly of claim 9 in which the slipping clutch includes an axially acting spring means in the form of two Belleville or dished spring members which act towards each other and grip the friction portion therebetween.

* * * * *

UNITED STATES PATENT AND TRADEMARK OFFICE
CERTIFICATE OF CORRECTION

PATENT NO.   : 6,378,678 B1
DATED        : April 30, 2002
INVENTOR(S)  : Bradley Armitage et al.

It is certified that error appears in the above-identified patent and that said Letters Patent is hereby corrected as shown below:

<u>Title page,</u>
Item [22], change "Jun. 28, 1998" to -- Jun. 25, 1999 --.
Item [86], change "PCT/GB98/01994" to -- PCT/GB99/01994 --.

Signed and Sealed this

Twenty-eighth Day of January, 2003

JAMES E. ROGAN
*Director of the United States Patent and Trademark Office*